Patented Dec. 30, 1924.

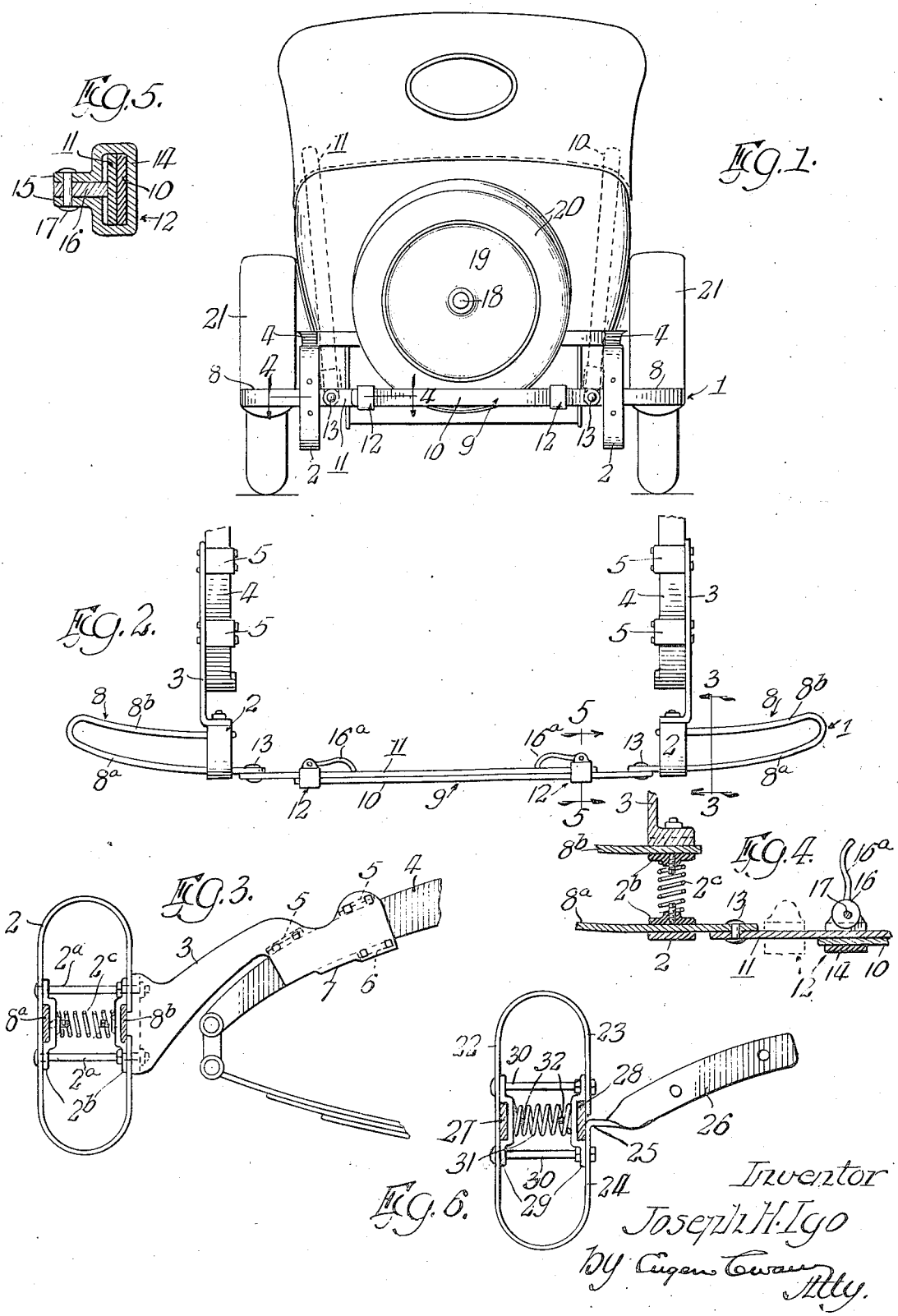

1,520,951

UNITED STATES PATENT OFFICE.

JOSEPH H. IGO, OF CHICAGO HEIGHTS, ILLINOIS, ASSIGNOR TO IGO MANUFACTURING CO., OF CHICAGO, ILLINOIS.

AUTOMOBILE BUMPER.

Application filed February 12, 1923, Serial No. 618,490. Renewed May 24, 1924.

*To all whom it may concern:*

Be it known that I, JOSEPH H. IGO, a citizen of the United States, residing at Chicago Heights, in the county of Cook and State of Illinois, have invented new and useful Improvements in Automobile Bumpers, of which the following is a specification.

This invention relates to bumpers for automobiles and other motor vehicles, particularly adapted for use at the rear ends thereof.

The main object of my invention is to provide hinged bumper means whereby the latter may be opened to provide a passageway therethrough between the attaching brackets and thus facilitate the removal of the spare wheel or tire, as the case may be, at the rear end of the car by having no parts of the bumper in the way.

The invention consists further in the matters hereinafter described and more particularly set forth in the appended claims.

In the accompanying drawings—

Fig. 1 is a rear view of an automobile equipped with bumper construction of my invention;

Fig. 2 is an enlarged top plan view of the bumper device of Fig. 1;

Fig. 3 is a vertical sectional view taken on line 3–3 of Fig. 2;

Fig. 4 is a fragmentary horizontal sectional view taken on line 4—4 of Fig. 1;

Fig. 5 is a vertical sectional view taken on line 5—5 of Fig. 2; and

Fig. 6 is a side view of a vertical guard member and integral attaching bracket of my invention.

The bumper device of my invention comprises horizontal bumper means, which in the particular form shown in the drawings takes the form of a horizontal bumper bar 1 extending across the rear end of an automobile, as shown in Fig. 1. Said bar 1 is carried by vertical guard members 2, 2 arranged adjacent the ends of the bar, and the guard members are carried by brackets 3, 3 by means of which the bumper means is clamped or otherwise attached to the side members 4, 4 of the automobile frame or chassis at the rear end of the car, as shown in Fig. 2. Each attaching bracket 3 is secured to its frame member 4 by upper clamp blocks 5, 5 and a lower clamp block 6 with a centrally arranged lug 7 engaging under the lower web of the frame member 4 in the same manner as described and claimed in my co-pending application, filed February 12, 1923, Serial No. 618,491.

The bumper bar 1 is made of spring steel or other suitable material and is divided into end sections 8, 8 and a mid-section 9. The latter is located between the vertical guards 2, 2, and is so constructed that it may be opened up to provide a clear passageway through the bumper in accordance with my invention. This mid-section 9, in the particular form of device shown in the drawings, comprises front and rear overlapping bars 10, 11 and clamp devices 12, 12 therefor. The front bar 10 is connected at one end by a hinge pin 13 with one of the end sections 8, while the rear bar 11 is connected by a similar pin 13 with the other end section 8. Said bars 10 and 11 overlap each other when extending between the end sections, as shown in full lines in the drawings. The free or swinging end of each mid-bar terminate short of the adjacent end section 8. When overlapped, said bars 10, 11 are clamped together by the clamp devices 12 and the bumper means is complete and unbroken from end to end.

When the devices 12, 12 are unclamped, the front and rear bars 10, 11 are released and may be swung about their hinge pins 13 into the vertical positions shown in dotted lines in Fig. 1. This provides the passageway heretofore mentioned through the bumper bar 1, and permits the spare tires or wheels, as the case may be, at the rear of the car, to be readily reached for removal and replaced without any part of the bumper bar interfering with reaching and removing them.

The clamp devices 12 are alike and each, as shown in the drawings, comprises a yoke 14 through which the overlapped parts 10 and 11 extend when in overlapped relation, as shown in Figs. 1 and 2. The yoke has end flanges 15, 15 on the same side, and these are spaced apart to receive between them an eccentric 16 mounted on a pin 17. The eccentric 16 has a handle 16ª, by means of which it may be turned to clamp and unclamp the overlapped bar sections 10, 11. When unclamped, the yokes 14, 14 are slid off the free ends of the bars 10, 11 and the latter may thereupon be swung into vertical positions mentioned. The clamps 12 are at that time retained on the bars 10, 11, as shown in dotted lines in Fig. 1. To close the space thus provided through the mid-part of the bumper bar 1, when the bars 10, 11 are swung down into overlapping position, the clamps 12 are moved toward each other to engage over the free ends of the bars and the latter clamped together, as in Figs. 1 and 2.

In Fig. 1, I have shown a spindle 18 carried by the car at its rear end and of a type to receive spare wheels, one of which is indicated by 19 and is of the so-called disk type. The spindle 18 is long eough to carry a plurality of these wheels and two are indicated in Fig. 1 by showing the inflated tires 20, 20 carried thereby. Of course wire wheels may be carried on the spindle 18 as well as the spoke type. In place of wheels, the usual spare tire brackets could be employed and, by being able to open the bumper between the attaching brackets 3, 3, the spare tires may be readily reached and removed without hindrance by any of the bumper means.

The end sections 8 of the bumper bar 1, as shown in Figs. 2 and 4, are bent to provide front and rear sections $8^a$, $8^b$. These extend inside of the guards 2, 2 and are held in place by bolts $2^a$ and blocks $2^b$ with springs $2^c$ between them, whereby adjustment of the end sections 8, 8 may be held to align the ends of the bumper with the outer edges of the rear fenders 21, 21.

In Fig. 6, I have shown the attaching bracket and vertical guard being integral instead of in two parts bolted together as in the preceding figures. In Fig. 6, the guard is made from a single strip of metal bent to have a front section 22 and two rear sections 23 and 24. These are in vertical alignment with the end of the upper section 23 terminating adjacent the upper end of the lower section 24. There the bar forming the guard is bent at right-angles outward, as at 25, and then twisted to constitute an attaching bracket 26, by means of which the guard may be fastened to a side member such as 4 of an automobile frame or chassis.

The horizontal bumper means associated with the guard 6 has a front section 27 and a rear section 28. These are held against the inside of the front and rear sections of the guard by blocks 29, 29. The latter are secured to the guard by bolts 30, 30 above and below the bumper sections 27, 28. The rear block 29 spans the meeting ends of the upper and lower sections 23, 24 of the rear part of the guard and connects them together as well as holds them in vertical alignment, as shown in Fig. 6. Between the blocks is a coiled spring 31 and set screws 32, 32 are provided for adjustably holding the bumper parts 27, 28 therein the same as in Fig. 3.

While I have shown and described in detail herein an automobile bumper construction made in accordance with my invention, it is of course to be understood that the details of construction and arrangement of parts illustrated may be variously changed and modified without departing from the spirit and scope of my invention.

I claim as my invention:

1. An automobile bumper construction, comprising spaced attaching brackets, vertical guard members carried by said brackets, and hinged bumper means extending between and carried by said guard members with the latter extending above and below the same, said bumper means when opened providing a passageway therethrough between said guard members.

2. An automobile bumper construction, comprising horizontal bumper means having end sections and a hinged mid-section, the latter enabling the bumper means to be opened to provide a passageway therethrough between said end sections, vertical guard members at the end sections and connected therewith, and attaching brackets carried by said guard members.

3. An automobile bumper construction, comprising horizontal bumper means having end sections and a hinged mid-section, the latter enabling the bumper means to be opened to provide a passageway therethrough between said end sections, vertical guard members at said end sections, means connecting the end sections with the guard members and permitting endwise adjustment of the end sections, and attaching brackets carried by said guard members.

4. An automobile bumper construction, comprising horizontal bumper means having end sections and a mid-section, the latter consisting of overlaping bars hinged, respectively, to the said end sections, means for detachably clamping said bars together when overlapped, and attaching brackets carried by said end sections.

5. An automobile bumper construction, comprising horizontal bumper means having end sections and a mid-section, the latter consisting of front and rear bars aligned with the end sections when overlapped and extending between said end sections, said bars being hinged to the respective end sections, each bar carrying a clamping device to engage the free end of the other bar for detachably clamping the bars in overlapped relation, and attaching brackets carried by said end sections.

6. An automobile bumper construction, comprising horizontal bumper means having end sections and a mid-section, vertical guard members at the end sections and connected therewith, said mid-section consisting of front and rear bars hinged to the respective end sections between said guard members, clamp devices carried by said bars adjacent their hinged ends and releasably engaging the free ends of the adjacent bars for holding the bars in overlapped relation, and attaching brackets carried by said guard members.

7. A vertical guard member and attaching bracket for an automobile bumper, said guard member having spaced front and rear sections joined top and bottom by spring loops, said bracket being integrally connected with the rear section of said guard member and extending rearward therefrom at a point intermediate said loops.

8. A vertical guard member and bracket for an automobile bumper, consisting of a continuous and one-piece strip of metal, said metal strip being bent to form spaced vertical front and rear sections for the vertical guard member connected top and bottom by integral loops and twisted at right-angles to the vertical guard member in its rear section to provide a rearwardly extending bracket.

9. An automobile bumper, comprising horizontal bumper means having a mid-section and two end sections, the latter being adjustable endwise, and attaching means for the bumper construction.

10. An automobile bumper, comprising horizontal bumper means having two end sections adjustable endwise, a mid-section between the end sections and capable of being opened to provide a passageway through the bumper, and attaching brackets for the bumper.

11. An automobile bumper, comprising horizontal bumper means having a mid-section and two end sections, and attaching brackets carrying said end sections, the latter having endwise adjustable connection with said brackets, said mid-section consisting of hinged bars for opening the bumper to provide a passageway therethrough.

12. An automobile bumper, comprising a mid-section and two end sections, said end sections consisting of front and rear members connected at their outer ends, said mid-section consisting of bars hinged, respectively, to the inner ends of said front members, and brackets carrying said end sections, the latter having endwise adjustable connection with said brackets.

13. An automobile bumper, comprising horizontal bumper means having two end sections and a mid-section, vertical guards at said end sections, blocks carried by said guards, said end sections slidably engaged with said blocks for endwise adjustment, and attaching brackets for the bumper.

14. An automobile bumper, comprising horizontal bumper means having two end sections and a mid-section, vertical guards at the end sections and having spaced front and rear upright portions, said end sections having front and rear members, blocks bolted to said guard portions and having slidable engagement with said members for endwise adjustment of said end sections, and brackets carried by said guards.

In testimony that I claim the foregoing as my invention, I affix my signature, this 27th day of November, A. D. 1922.

JOSEPH H. IGO.